United States Patent
Tanaka et al.

(10) Patent No.: US 8,178,628 B2
(45) Date of Patent: May 15, 2012

(54) ALIPHATIC POLYESTER RESIN COMPOSITION AND METHOD FOR PRODUCTION THEREOF

(75) Inventors: Shukichi Tanaka, Tokyo (JP); Yukihiro Kiuchi, Tokyo (JP); Masatoshi Iji, Tokyo (JP)

(73) Assignee: NEC Corporation, Tokyo (JP)

(*) Notice: Subject to any disclaimer, the term of this patent is extended or adjusted under 35 U.S.C. 154(b) by 0 days.

(21) Appl. No.: 12/373,785

(22) PCT Filed: Jun. 4, 2007

(86) PCT No.: PCT/JP2007/061278
§ 371 (c)(1),
(2), (4) Date: Jan. 14, 2009

(87) PCT Pub. No.: WO2008/010355
PCT Pub. Date: Jan. 24, 2008

(65) Prior Publication Data
US 2009/0318628 A1  Dec. 24, 2009

(30) Foreign Application Priority Data
Jul. 21, 2006  (JP) .................................. 2006-199560

(51) Int. Cl.
*C08G 63/91*  (2006.01)
(52) U.S. Cl. ........ 525/415; 525/410; 525/450; 528/361; 528/492
(58) Field of Classification Search .................. 525/450, 525/410, 415; 528/361, 492
See application file for complete search history.

(56) References Cited

U.S. PATENT DOCUMENTS
5,973,024 A * 10/1999 Imashiro et al. ............. 523/124

FOREIGN PATENT DOCUMENTS

| JP | 47-33279 | 8/1972 |
|---|---|---|
| JP | 11-080522 | 3/1999 |
| JP | 2002-030208 | 1/2002 |
| JP | 2002-115121 | 4/2002 |
| JP | 2003-003052 | 1/2003 |
| JP | 2003-301327 | 10/2003 |
| JP | 2004-183174 | 7/2004 |
| JP | 2004-183175 | 7/2004 |
| JP | 2004-183177 | 7/2004 |
| JP | 2005-154930 | * 6/2005 |
| JP | 2006-111735 | 4/2006 |

OTHER PUBLICATIONS

Machine translation of JP 2003-003052 [online], accessed via the Internet [retrieved on Jan. 25, 2010], URL: <http://www4.ipdl.inpit.go.jp/Tokujitu/PAJdetail.ipdl?N0000=60&N0120=01&N2001=2&N3001=2003-003052>.*
Alger, M.; Polymer Science Dictionary, 1997, p. 66.*
Campbell et al., "High Polymers Containing the Carbodiimide Repeat Unit", Journal of Organic Chemistry (1963), pp. 2069-2075, vol. 28, E.I. du Pont de Nemours and Company, Inc., Wilmington, Delaware.
Williams et al., "Carbodiimide Chemistry", Chemical Reviews (1981), pp. 619-621, vol. 81, No. 4.

* cited by examiner

*Primary Examiner* — David W Wu
*Assistant Examiner* — Robert Jones, Jr.
(74) *Attorney, Agent, or Firm* — Scully, Scott, Murphy & Presser, P.C.

(57) ABSTRACT

The present invention relates to an aliphatic polyester resin composition having excellent hydrolysis resistance, added to an aliphatic polyester resin (A), a reactive monomer (B) (e.g. a monocarbodiimide compound) and a reactive polymer (C) (e.g. a polycarbodiimide compound).

14 Claims, No Drawings

ALIPHATIC POLYESTER RESIN COMPOSITION AND METHOD FOR PRODUCTION THEREOF

TECHNICAL FIELD

The present invention relates to an aliphatic polyester resin composition having substantially improved hydrolysis resistance, and a method for production thereof.

BACKGROUND ART

In recent years, plant-derived resins have attracted attention as an alternative for petroleum-derived resins, and active investigations have been made on the practical use of resin compositions using a variety of plant-derived resins. For examples of the use of the plant-derived resins, aliphatic polyester resins are particularly watched and are a commercial reality for various applications.

The aliphatic polyester resins are mainly used for the applications, such as containers and packaging, films for agriculture, and the like, based on using for a short period and disposing after used. However, the using span of such resin has been recently expanded to use in durable goods that require initial properties to be maintained for a long period, such as casings for home electrical appliances or OA apparatuses, and automotive parts. In recent years, as a plant-derived aliphatic polyester resin under particularly active research and development, there are known polylactic acid, polybutylene succinate, polyglycolic acid, polyhydroxyalkanoic acid, and the like.

However, an aliphatic polyester resin is easily hydrolyzed in comparison with a conventional general-purpose resin, and thus it has poor durability. Therefore, in order to maintain the initial properties for a long period, it is necessary to improve hydrolysis resistance of an aliphatic polyester resin.

In order to improve hydrolysis resistance of an aliphatic polyester resin, a compound having a functional group that is possible to block carboxy group terminals of the aliphatic polyester resin such as a carbodiimide compound and an epoxy compound is added.

A carbodiimide compound is a compound having a carbodiimide group represented by "—N=C=N—" in the molecule, and basically produced by well-known methods (see, for example, Patent Document 1, Non-Patent Document 1 and Non-Patent Document 2).

Addition of 1% by mass of polycarbodiimide compound excellent in heat resistance and stability to an aliphatic polyester resin is also proposed (see, for example, Patent Document 2). In this aliphatic polyester resin composition, a carbodiimide group reacts with and blocks free carboxy group terminal of the aliphatic polyester resin, thereby improving hydrolysis resistance of the aliphatic polyester resin.

However, when an aliphatic polyester resin is used in durable goods, it is necessary to increase the addition of polycarbodiimide compound to 5 to 10% by mass for obtaining sufficient hydrolysis resistance. Although the addition is increased, it is impossible to achieve a certain level or higher level (about 200 hours during which 70% of average molecular weight is maintained at 80° C. and 95% RH) of hydrolysis resistance. Thus, there has been a demand for further improvement in hydrolysis resistance.

Patent Document 1: Japanese Patent Publication No. 47-33279
Patent Document 2: Japanese Patent-Laid Open Publication No. 11-80522
Non-Patent Document 1: J. Org. Chem. 28, 2069-2075 (1963)
Non-Patent Document 2: Chemical Review, 81, 4, 619-621 (1981)

DISCLOSURE OF THE INVENTION

Problems to be Solved by the Invention

Therefore, an object of the present invention is to provide an aliphatic polyester resin composition having substantially more excellent hydrolysis resistance than a conventional aliphatic polyester resin composition, and a producing method thereof.

Means for Solving the Problems

The present inventors have made intensive studies to solve the above problem. As a result, they have found that the use of an aliphatic polyester resin (A) in combination with a reactive monomer (B) and a reactive polymer (C) substantially enhances hydrolysis resistance.

Specifically, an aliphatic polyester resin composition which has the terminal carboxy group concentration of the aliphatic polyester resin (A) reduced by addition of the monomer (B) reactive with a carboxy group and which is obtained by further addition of a reactive polymer (C) exhibits more excellent hydrolysis resistance than a conventional hydrolysis resistance formulation.

Also, they have found that the addition of the reactive polymer (C) after adding the reactive monomer (B) results in further excellent hydrolysis resistance.

The present invention has been made finally based on these findings.

Namely, the present invention has the following constitutions [1] to [8].

[1] An aliphatic polyester resin composition, characterized by comprising: an aliphatic polyester resin (A); a reactive monomer (B); and a reactive polymer (C), wherein the aliphatic polyester resin (A) and the reactive monomer (B) in total are present in an amount of 90% by mass to 99.9% by mass and the reactive polymer (C) is present in an amount of 0.1% by mass to 10% by mass, with respect to the total amount of (A), (B) and (C).

[2] The aliphatic polyester resin composition according to the above [1], characterized in that the aliphatic polyester resin (A) is a polylactic acid resin.

[3] The aliphatic polyester resin composition according to the above [1] or [2], characterized in that the reactive monomer (B) is a monocarbodiimide compound.

[4] The aliphatic polyester resin composition according to any of the above [1] to [3], characterized in that the reactive monomer (B) is an aromatic monocarbodiimide compound.

[5] The aliphatic polyester resin composition according to any of the above [1] to [4], characterized in that the reactive polymer (C) is a polycarbodiimide compound.

[6] The aliphatic polyester resin composition according to any of the above [1] to [5], characterized in that the reactive polymer (C) is an aromatic polycarbodiimide compound.

[7] A method for producing an aliphatic polyester resin composition of any of the above [1] to [6], comprising; adding the reactive monomer (B) first, and then adding the reactive polymer (C) to the aliphatic polyester resin (A).

[8] A molded article, made from an aliphatic polyester resin composition of any of the above [1] to [6].

Effect of the Invention

The aliphatic polyester resin composition of the present invention is good in hydrolysis resistance. The reactive monomer reacts with a carboxy group at the terminals of the resin to reduce the carboxy group concentration, thus delaying the initiation of hydrolysis. Further, the reactive polymer imparts sustainable hydrolysis resistance thereby to considerably enhance hydrolysis resistance. Therefore, the aliphatic polyester resin composition of the present invention can be processed into a molded product by various methods such as an injection molding method, a film molding method, a blow molding method, and a foam molding method, and can be used for various applications such as electric or electronic devices, for example, casings for electrical appliances; building materials; automotive parts; use in daily necessities; medical care; and agriculture use.

BEST MODE FOR CARRYING OUT THE INVENTION

Next, the present invention is described in detail.

An aliphatic polyester resin composition of the present invention is an aliphatic polyester resin composition having improved hydrolysis resistance, wherein a reactive monomer (B) and a reactive polymer (C) are added in sequence or simultaneously to an aliphatic polyester resin (A).

1. Aliphatic Polyester Resin (A)

The aliphatic polyester resin (A) used in the present invention is an aliphatic polyester resin having hydrolysis and remarkable biodegradability. Specific examples thereof include polylactic acid, polybutylene succinate, a poly(butylene succinate/adipate) copolymer, polyglycolic acid, poly(3-hydroxybutylate), a poly(3-hydroxybutylate·3-hydroxyvalerate) copolymer, and a mixture thereof. Among these, polylactic acid is preferred since it has high heat resistance and various excellent properties such as mechanical properties.

As the polylactic acid preferably used in the present invention, those synthesized by generally well-known methods can be used. That is, as the method, known are: a single step direct polymerization wherein L-lactic acid, D-lactic acid and DL-lactic acid (racemate) are subjected to direct dehydration-condensation in a solvent; and a two-step lactide method wherein a cyclic dimer (lactide) obtained by using lactic acid as a raw material is subjected to ring opening polymerization. As a catalyst used in these methods, compounds of tin, antimony, zinc, titanium, iron, aluminum or the like can be exemplified. Among these, tin catalysts or aluminum catalysts are preferred. Particularly, tin octylate and aluminum acetyl acetonate are preferred. As the polylactic acid used in the present invention, any one obtained by any production method can be used.

In the present invention, a polylactic acid preferably has a higher number average molecular weight Mn. Usually, the number average molecular weight is preferably 30,000 or more, and more preferably 70,000 to 100,000.

Further, the polylactic acid used in the present invention may be a copolymerized polylactic acid wherein other monomer component having ester forming ability is copolymerized with L-lactic acid and D-lactic acid. Examples of the copolymerizable monomer component include: hydroxycarboxylic acids such as glycolic acid, 3-hydroxybutyric acid, 4-hydroxybutyric acid, 4-hydroxyvaleric acid and 6-hydroxycaproic acid; compounds having a plurality of hydroxyl groups in the molecule such as ethylene glycol, propylene glycol, butanediol, neopentyl glycol, polyethylene glycol, glycerol and pentaerythritol; and compounds having a plurality of carboxy groups in the molecule such as succinic acid, adipic acid, sebacic acid, fumaric acid, terephthalic acid, isophthalic acid, and 2,6-naphthalene dicarboxylic acid.

Further, in order to reduce melt viscosity of the polylactic acid, an aliphatic polyester such as polycaprolactone, poly(3-hydroxybutylate), polybutylene succinate, and polyethylene succinate can be used as an internal or external plasticizer.

2. Reactive Monomer (B) and Reactive Polymer (C)

In order to prevent hydrolysis of the aliphatic polyester resin (A), the reactive monomer (B) and the reactive polymer (C) are blended with the aliphatic polyester resin (A).

(1) Reactive Monomer (B)

The reactive monomer (B) used in the present invention is a compound having a functional group, which reacts with a free carboxy group at the terminals of the aliphatic polyester resin, for example, such as a carbodiimide compound, an epoxy compound, an isocyanate compound, an oxazoline compound, an oxazine compound and an aziridine compound. Among these, the carbodiimide compound is preferred since it is excellent in stability and reactivity with a terminal carboxy group.

As the carbodiimide compound used as the reactive monomer (B), a monocarbodiimide compound having one carbodiimide group in the molecule is preferred. In other words, a monocarbodiimide compound is more reactive than a polycarbodiimide compound having two or more carbodiimide groups in the molecule, so it can be effectively added to a terminal carboxy group of the aliphatic polyester resin (A). A monocarbodiimide compound does not causes high viscosity or gelation, which occurs when a polycarbodiimide compound is used, thus enabling the reduction of carboxy group concentration of the aliphatic polyester resin without fluidity deterioration.

As the monocarbodiimide compound, there may be exemplified a compound having a basic structure of the following general formula (I).

(I)

In the formula, R and R' represent an aliphatic, alicyclic or aromatic organic group comprising C and H.

Specific examples of the monocarbodiimide compound include dicyclohexylcarbodiimide, diisopropylcarbodiimide, diphenylcarbodiimide, bis(methylphenyl)carbodiimide, bis(methoxyphenyl)carbodiimide, bis(nitrophenyl)carbodiimide, bis(dimethylphenyl)carbodiimide, bis(diisopropylphenyl)carbodiimide, bis(di-t-butylphenyl)carbodiimide, N-ethyl-N'-(3-dimethylaminopropyl)carbodiimide, bis(triphenylsilyl)carbodiimide and cyclic carbodiimides. Among these, an aromatic monocarbodiimide is more preferred from the viewpoint of improving low volatility, humidity resistance and flame resistance. For example, it is exemplified such as the following aromatic monocarbodiimides.

[Formula 1]

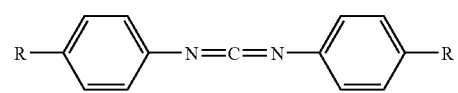

In the formula, R represents H, Me, OMe or $NO_2$.

[Formula 2]

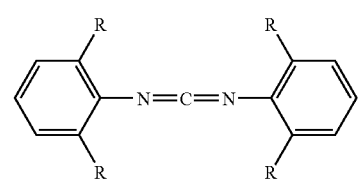

In the formula, R represents Me, i-Pr or t-Bu.

[Formula 3]

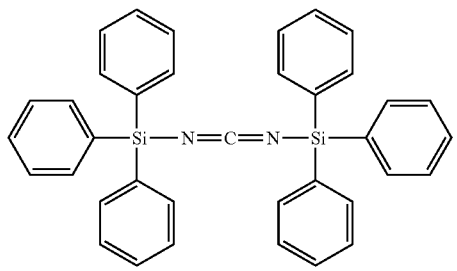

[Formula 4]

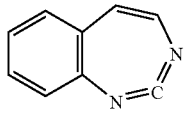

These chemical formulas are for indicating exemplary aromatic monocarbodiimides and are not limited thereto.

The reactive monomer (B) is used for reducing the concentration of carboxy group of an aliphatic polyester resin as a raw material. Thus, the amount thereof to be used is dependent on carboxy group (pertaining to the molecular weight) of the aliphatic polyester resin, but the amount is appropriate so that the concentration of carboxy group is usually 5 mol/$10^3$ kg or less after blending. A lower concentration of carboxy group is preferred, and usually, the concentration is preferably 5 mol/$10^3$ kg or less, and more preferably 2 mol/$10^3$ kg or less. When the concentration of carboxy group is greater than 5 mol/$10^3$ kg, a part of the reactive polymer (C) used in combination reacts at an initial stage of addition thereof and the aliphatic polyester resin composition becomes highly viscous or gelled, deteriorating hydrolysis resistance.

(2) Reactive Polymer (C)

The reactive polymer (C) used in the present invention is a compound having a plurality of functional groups capable of easily reacting with free carboxy groups, which are generated from the decomposition of an aliphatic polyester resin. Examples thereof include a carbodiimide compound, an epoxy compound, an isocyanate compound, an oxazoline compound, an oxazine compound and an aziridine compound. Among these, preferred is the carbodiimide compound excellent in terms of stability and reactivity with a terminal carboxy group.

The carbodiimide compound used as the reactive polymer (C) is preferably a polycarbodiimide compound having two or more carbodiimide group in the molecule. A plurality of carbodiimide groups are added to a terminal carboxy group, and thereby molecular chains of an aliphatic polyester resin that have been cleaved by hydrolysis are recombined with each other. Further, a polycarbodiimide compound has higher stability than a monocarbodiimide compound and thus can provide sustainable hydrolysis resistance to an aliphatic polyester resin composition.

As the polycarbodiimide compound, there is exemplified such as a compound having a basic structure of the following general formula (II).

[Formula 5]

$$-[N=C=N-R]_n-\quad\quad (II)$$

In the formula, n represents an integer of 2 or more and is usually arranged between 2 and 50; and R represents an aliphatic chain, alicyclic or aromatic organic group comprising C and H.

A polycarbodiimide compound synthesized by a generally well-known method can be used. For example, usable is one that is synthesized by decarboxylation condensation reaction of various organic diisocyanates at a temperature of about 70° C. or more in the absence of a solvent or in an inert solvent using an organophosphorus compound or an organometallic compound as a catalyst.

As a raw material organic diisocyanate for producing polycarbodiimide compounds, there may be exemplified such as an aromatic diisocyanate, an aliphatic diisocyanate, an alicyclic diisocyanate, and a mixture thereof. Specifically exemplified are 1,5-naphthalene diisocyanate, 4,4'-diphenylmethane diisocyanate, 4,4'-diphenyldimethylmethane diisocyanate, 1,3-phenylenediisocyanate, 1,4-phenylenediisocyanate, 2,4-tolylenediisocyanate, 2,6-tolylenediisocyanate, hexamethylene diisocyanate, cyclohexane-1,4-diisocyanate, xylylene diisocyanate, isophorone diisocyanate, dicyclohexylmethane-4,4'-diisocyanate, methylcyclohexane diisocyanate, tetramethylxylylene diisocyanate, 3,3',5,5'-tetraisopropylbiphenyl-4,4'-diisocyanate, and 1,3,5-triisopropylbenzene-2,4-diisocyanate. Among these, a aromatic diisocyanate is more preferred from the viewpoint of improving humidity resistance and flame resistance.

The reactive polymer (C) is necessary to be used in an amount of 0.1% by mass to 10% by mass based on the total amount of the aliphatic polyester resin (A), the reactive monomer (B) and the reactive polymer (C) in order to achieve the effect of the present invention. If it is used less than 0.1% by mass, an improvement effect of hydrolysis resistance cannot exert. Even if the use amount is additionally increased to more than 10% by mass thereof, it is impossible to obtain an improvement of hydrolysis resistance commensurate with the amount increased.

(3) Action Mechanism of Reactive Monomer (B) and Reactive Polymer (C)

When the reactive monomer (B) and the reactive polymer (C) are blended with the aliphatic polyester resin in the present invention, the reactive monomer (B) blocks a hydrolysis-facilitating terminal carboxy group to prevent hydrolysis as its function at an early stage after the addition. On the other hand, the reactive polymer (C) bonds to an aliphatic polyester resin occurred by cleaving an ester bond through hydrolysis reaction, particularly a terminal carboxy group of the polylactic acid resin. Then, the molecular chains of aliphatic polyesters are recombined for maintaining the molecular weight.

Therefore, when the reactive monomer (B) and the reactive polymer (C) are mixed with the aliphatic polyester resin, they may be melt-kneaded at the same time. However, the reactive monomer (B) is firstly mixed with the aliphatic polyester resin to allow them to sufficiently react with each other, and then the reactive polymer (C) is added thereto to be mixed therewith, thereby providing a better effect.

3. Other Additives

In addition to the reactive monomer (B) and the reactive polymer (C), the aliphatic polyester resin composition of the present invention may contain additives other than the above in such a range that the effect of the invention is not impaired. Examples of such additive include inorganic fillers, a reinforcing agent, a coloring agent (such as titanium oxide), a stabilizer (such as a radical-capturing agent and an antioxidant), a flame retardant (such as a well-known metal hydrate, a halogen flame retardant and a phosphorus flame retardant), a well-known nucleating agent (such as talc), an antimicrobial agent, and a fungicide.

As the inorganic filler, silica, alumina, sand, clay, slag, etc. can be used. As the reinforcing agent, an acicular inorganic substance can be used. Further, as the antimicrobial agent, silver ion, copper ion and a zeolite containing these ions can be exemplified.

The aliphatic polyester resin composition of the present invention can be processed, by an injection molding method, a film molding method, a blow molding method, a foam molding method, etc., into molded articles used for electric or electronic devices such as casings for electrical appliances; building materials; automotive parts; daily necessities; medical care; and agriculture use.

The method for mixing various blending components with the aliphatic polyester resin composition is not particularly limited, and can be employed by mixing by a well-known mixer such as a tumbler, a ribbon blender, and a uniaxial- or biaxial-kneader; or melt-mixing by an extruder, a roll or the like.

The method for molding the aliphatic polyester resin composition of the present invention is not particularly limited, and a molding method required for producing ordinary electrical or electronic appliances can be used such as well-known injection molding methods, injection-compression molding methods, and compression molding methods. A temperature for the melt-mixing or the molding can be set at the melting or higher temperature of the aliphatic polyester resin and in such a range that the aliphatic polyester resin does not suffer heat deterioration.

EXAMPLES

Hereafter, the present invention is described further in detail by referring to specific examples. In the examples, physical properties were measured and evaluated by the following methods.

(1) Total Amount of Added Carbodiimide Groups (mol/$10^3$ Kg)

The total amount of added carbodiimide groups is calculated using the following equation from carbodiimide equivalent of carbodiimide compounds added to each composition and a content rate thereof.

Total amount of added carbodiimide groups=carbodiimide equivalent×content rate in composition (%)×$10^6$ (2) Hydrolysis Resistance Resin composition pellets produced were subjected to wet heat test at 80° C. and 95% RH, and change of their weight average molecular weight was measured using GPC (gel permeation chromatography). Then, its molecular weight retention rate was calculated at predetermined intervals by the following equation.

Molecular weight retention rate (%)=(Mw after wet heat test)/(Mw before wet heat test)×100

When the obtained molecular weight retention rate becomes 70%, the time was recorded as a hydrolysis resistance time. The figure 70% was determined as the standard since the strength is rapidly deteriorated at a molecular weight retention rate around 70% or below.

Example 1

Polylactic acid (manufactured by Unitika Ltd., Mn=100,000) 98% by mass and aromatic monocarbodiimide (manufactured by Rheim Chemie Co., Stabaxol I (product name), bis(diisopropylphenyl)carbodiimide) 2% by mass were mixed. The mixture was melt-kneaded in a desktop kneader, which was set so that the mixture had a temperature of about 180° C., preparing terminal-blocked polylactic acid A. The terminal-blocked polylactic acid was dissolved in chloroform and an appropriate amount of methanol was added thereto. Then, the solution was titrated with an aqueous sodium hydroxide solution for measuring a concentration of terminal carboxy group. The carboxy group concentration was 0.8 mol/$10^3$ kg.

This terminal-blocked polylactic acid A 97% by mass and aliphatic polycarbodiimide (manufactured by Nisshinbo Industries, Inc., Carbodiimide LA-1 (product name)) 3% by mass were mixed. The mixture was melt-kneaded in a desktop kneader, which was set so that the mixture had a temperature of about 180° C., preparing pellets with a 3-mm diameter and a 5-mm length. The obtained pellets were used for evaluation of hydrolysis resistance. Table 1 shows the total amount of added carbodiimide group and the evaluation result on hydrolysis resistance.

Example 2

Polylactic acid 95.1% by mass, aromatic monocarbodiimide 1.9% by mass and aliphatic polycarbodiimide 3% by mass were mixed. The mixture was melt-kneaded in a desktop kneader, which was set so that the mixture had a temperature of about 180° C., and then extruded by an extruder, preparing pellets with a 3-mm diameter and a 5-mm length. The obtained pellets were used for evaluation of hydrolysis resistance. Table 1 shows the total amount of added carbodiimide group and the evaluation result on hydrolysis resistance.

Comparative Example 1

Polylactic acid 95.1% by mass and aliphatic polycarbodiimide 4.9% by mass were mixed. The mixture was melt-kneaded in a desktop kneader, which was set so that the mixture had a temperature of about 180° C., and then extruded by an extruder, preparing pellets with a 3-mm diameter and a 5-mm length. The obtained pellets were used for evaluation of hydrolysis resistance. Table 1 shows the total amount of added carbodiimide group and the evaluation result on hydrolysis resistance.

Comparative Example 2

Polylactic acid 95.1% by mass and aromatic monocarbodiimide 4.9% by mass were mixed. The mixture was melt-kneaded in a desktop kneader, which was set so that the mixture had a temperature of about 180° C., and then extruded by an extruder, preparing pellets with a 3-mm diameter and a 5-mm length. The obtained pellets were used for evaluation of hydrolysis resistance. Table 1 shows the total amount of added carbodiimide group and the evaluation result on hydrolysis resistance.

Comparative Example 3

Polylactic acid 97% by mass and aliphatic polycarbodiimide 3% by mass were mixed. The mixture was melt-kneaded in a desktop kneader, which was set so that the mixture had a temperature of about 180° C., and then extruded by an extruder, preparing pellets with a 3-mm diameter and a 5-mm length. The obtained pellets were used for evaluation of hydrolysis resistance. Table 1 shows the total amount of added carbodiimide group and the evaluation result on hydrolysis resistance.

Comparative Example 4

Polylactic acid 98.1% by mass and aromatic monocarbodiimide 1.9% by mass were mixed. The mixture was melt-kneaded in a desktop kneader, which was set so that the mixture had a temperature of about 180° C., and then extruded by an extruder, preparing pellets with a 3-mm diameter and a 5-mm length. The obtained pellets were used for evaluation of hydrolysis resistance. Table 1 shows the total amount of added carbodiimide group and the evaluation result on hydrolysis resistance.

TABLE 1

| | | | Example | | Comparative Example | | | |
|---|---|---|---|---|---|---|---|---|
| | | | 1 | 2 | 1 | 2 | 3 | 4 |
| Blend | Polylactic acid | Amount % by mass | 95.1 | 95.1 | 95.1 | 95.1 | 97.0 | 98.1 |
| | | Carboxy group concentration*1 | 23 | 23 | 23 | 23 | 23 | 23 |
| | Monocarbodiimide | Amount % by mass | 1.9 | 1.9 | — | 4.9 | — | 1.9 |
| | Reaction between polylactic acid and monocarbodiimide | | Yes | No | — | — | — | — |
| | Carboxy group concentration after reaction between polylacticacid and monocarbodiimide*1 | | 0.8 | — | — | — | — | — |
| | Polycarbodiimide | Kind*2 | LA | LA | LA | — | LA | — |
| | | Amount % by mass | 3 | 3 | 4.9 | — | 3 | — |
| | Total amount of added carbodiimide group*3 | | 172 | 172 | 196 | 135 | 120 | 53 |
| Hydrolysis resistance (Hour)*4 | | | 500 | 370 | 230 | 150 | 180 | 120 |

*1Unit: mol/10³ kg
*2LA: aliphatic polycarbodiimide "Carbodiimide LA-1" (product name)
*3Unit: mol/10³ kg (total blending)
*4Period during which 70% of initial polylactic acid molecular weight is maintained at 80° C. and 95% RH.

As is obvious from the results of Examples and Comparative Examples shown in Table 1, Example 1 wherein the reactive monomer (B) was added to the aliphatic polyester resin (A) and then the reactive polymer (C) was added thereto; and Example 2 wherein various additives were simultaneously added had much more improved hydrolysis resistance than Comparative Examples 1 to 4 wherein the additives were used independently.

Example 3

The terminal-blocked polylactic acid A (prepared in Example 1) 97% by mass and as the reactive polymer, aromatic polycarbodiimide (Rheim Chemie Co., Stabaxol P (product name)) 3% by mass were mixed. The mixture was melt-kneaded in a desktop kneader, which was set so that the mixture had a temperature of about 180° C., and then extruded by an extruder, preparing pellets with a 3-mm diameter and a 5-mm length. The obtained pellets were used for evaluation of hydrolysis resistance. Table 2 shows the total amount of added carbodiimide group and the evaluation result on hydrolysis resistance.

Example 4

Polylactic acid 95.1% by mass, aromatic monocarbodiimide 1.9% by mass and aromatic polycarbodiimide 3% by mass were mixed. The mixture was melt-kneaded in a desktop kneader, which was set so that the mixture had a temperature of about 180° C., and then extruded by an extruder, preparing pellets with a 3-mm diameter and a 5-mm length. The obtained pellets were used for evaluation of hydrolysis resistance. Table 2 shows the total amount of added carbodiimide group and the evaluation result on hydrolysis resistance.

Example 5

Polylactic acid 99% by mass and aromatic monocarbodiimide 1% by mass were mixed. The mixture was melt-kneaded in a desktop kneader, which was set so that the mixture had a temperature of about 180° C., preparing terminal-blocked polylactic acid B. This terminal-blocked polylactic acid was dissolved in chloroform and an appropriate amount of methanol was added thereto. Then, the solution was titrated with an aqueous solution sodium hydroxide for measuring a concentration of terminal carboxy group. The carboxy group concentration was 1.1 mol/10³ kg.

This terminal-blocked polylactic acid B 97% by mass and aromatic polycarbodiimide 3% by mass were mixed. The mixture was melt-kneaded in a desktop kneader, which was set so that the mixture had a temperature of about 180° C., preparing pellets with a 3-mm diameter and a 5-mm length. The obtained pellets were used for evaluation of hydrolysis resistance. Table 2 shows the total amount of added carbodiimide group and the evaluation result on hydrolysis resistance.

Example 6

Polylactic acid 96% by mass, aromatic monocarbodiimide 1% by mass and aromatic polycarbodiimide 3% by mass were mixed. The mixture was melt-kneaded in a desktop kneader, which was set so that the mixture had a temperature of about 180° C., and then extruded by an extruder, preparing pellets with a 3-mm diameter and a 5-mm length. The obtained pellets were used for evaluation of hydrolysis resistance. Table 2 shows the total amount of added carbodiimide group and the evaluation result on hydrolysis resistance.

Comparative Example 5

Polylactic acid 95.1% by mass and aromatic polycarbodiimide 4.9% by mass were mixed. The mixture was melt-kneaded in a desktop kneader, which was set so that the mixture had a temperature of about 180° C., and then extruded by an extruder, preparing pellets with a 3-mm diameter and a 5-mm length. The obtained pellets were used for evaluation of hydrolysis resistance. Table 2 shows the total amount of added carbodiimide group and the evaluation result on hydrolysis resistance.

Comparative Example 6

Polylactic acid 96% by mass and aromatic polycarbodiimide 4% by mass were mixed. The mixture was melt-kneaded in a desktop kneader, which was set so that the mixture had a temperature of about 180° C., and then extruded by an extruder, preparing pellets with a 3-mm diameter and a 5-mm length. The obtained pellets were used for evaluation of hydrolysis resistance. Table 2 shows the total amount of added carbodiimide group and the evaluation result on hydrolysis resistance.

Comparative Example 7

Polylactic acid 96% by mass and aromatic monocarbodiimide 4% by mass were mixed. The mixture was melt-kneaded in a desktop kneader, which was set so that the mixture had a temperature of about 180° C., and then extruded by an extruder, preparing pellets with a 3-mm diameter and a 5-mm length. The obtained pellets were used for evaluation of hydrolysis resistance. Table 2 shows the total amount of added carbodiimide group and the evaluation result on hydrolysis resistance.

of about 180° C., and then extruded by an extruder, preparing pellets with a 3-mm diameter and a 5-mm length. The obtained pellets were used for evaluation of hydrolysis resistance. Table 3 shows the total amount of added carbodiimide group and the evaluation result on hydrolysis resistance.

Example 8

Polylactic acid 92.1% by mass, aromatic monocarbodiimide 0.9% by mass and as the reactive polymer, aromatic polycarbodiimide 7% by mass were mixed. The mixture was melt-kneaded in a desktop kneader, which was set so that the mixture had a temperature of about 180° C., and then extruded by an extruder, preparing pellets with a 3-mm diameter and a 5-mm length. The obtained pellets were used for evaluation of hydrolysis resistance. Table 3 shows the total amount of added carbodiimide group and the evaluation result on hydrolysis resistance.

Comparative Example 8

Polylactic acid 92.1% by mass and aromatic polycarbodiimide 7.9% by mass were mixed. The mixture was melt-kneaded in a desktop kneader, which was set so that the mixture had a temperature of about 180° C., and then extruded by an extruder, preparing pellets with a 3-mm diameter and a 5-mm length. The obtained pellets were used for

TABLE 2

| Blend | | | Example | | | | Comparative Example | | | |
| --- | --- | --- | --- | --- | --- | --- | --- | --- | --- | --- |
| | | | 3 | 4 | 5 | 6 | 5 | 2 | 6 | 7 |
| Blend | Polylactic acid | Amount % by mass | 95.1 | 95.1 | 96.0 | 96.0 | 95.1 | 95.1 | 96.0 | 96.0 |
| | | Carboxy group concentration*[1] | 23 | 23 | 23 | 23 | 23 | 23 | 23 | 23 |
| | Monocarbodiimide | Amount % by mass | 1.9 | 1.9 | 1 | 1 | — | 4.9 | — | 4 |
| | Reaction between polylactic acid and monocarbodiimide | | Yes | No | Yes | No | — | — | — | — |
| | Carboxy group concentration after reaction between polylacticacid and monocarbodiimide*[1] | | 0.8 | — | 1.1 | — | — | — | — | — |
| | Polycarbodiimide | Kind*[2] | P | P | P | P | P | — | P | — |
| | | Amount % by mass | 3 | 3 | 3 | 3 | 4.9 | — | 4 | — |
| | Total amount of added carbodiimide group*[3] | | 135 | 135 | 111 | 111 | 135 | 135 | 111 | 111 |
| Hydrolysis resistance (Hour)*[4] | | | 620 | 600 | 310 | 300 | 180 | 150 | 170 | 150 |

*[1]Unit: mol/10³ kg
*[2]P: aromatic polycarbodiimide "Stabaxol P" (product name)
*[3]Unit: mol/10³ kg (total blending)
*[4]Period during which 70% of initial polylactic acid molecular weight is maintained at 80° C. and 95% RH.

As is obvious from the results of Examples and Comparative Examples shown in Table 2, Examples 3 and 5 wherein the reactive monomer (B) was added to the aliphatic polyester resin (A) and then the reactive polymer (C) was added thereto; and Examples 4 and 6 wherein various additives were simultaneously added had much more improved hydrolysis resistance than Comparative Examples 5 to 7 wherein the additives were used independently.

Example 7

Terminal-blocked polylactic acid B (prepared in Example 5) 93% by mass and aromatic polycarbodiimide 7% by mass were mixed. The mixture was melt-kneaded in a desktop kneader, which was set so that the mixture had a temperature evaluation of hydrolysis resistance. Table 3 shows the total amount of added carbodiimide group and the evaluation result on hydrolysis resistance.

Comparative Example 9

Polylactic acid 92.1% by mass and aromatic monocarbodiimide 7.9% by mass were mixed. The mixture was melt-kneaded in a desktop kneader, which was set so that the mixture had a temperature of about 180° C., and then extruded by an extruder, preparing pellets with a 3-mm diameter and a 5-mm length. The obtained pellets were used for evaluation of hydrolysis resistance. Table 3 shows the total amount of added carbodiimide group and the evaluation result on hydrolysis resistance.

TABLE 3

|  |  |  | Example | | Comparative Example | |
|---|---|---|---|---|---|---|
|  |  |  | 7 | 8 | 8 | 9 |
| Blend | Polylactic acid | Amount % by mass | 92.1 | 92.1 | 92.1 | 92.1 |
|  |  | Carboxy group concentration*[1] | 23 | 23 | 23 | 23 |
|  | Monocarbodiimide | Amount % by mass | 0.9 | 0.9 | — | 7.9 |
|  | Reaction between polylactic acid and monocarbodiimide |  | Yes | No | — | — |
|  | Carboxy group concentration after reaction between polylactic acid and monocarbodiimide*[1] |  | 1.1 | — | — | — |
|  | Polycarbodiimide | Kind*[2] | P | P | P | — |
|  |  | Amount % by mass | 7 | 7 | 7.9 | — |
|  | Total amount of added carbodiimide group*[3] |  | 221 | 221 | 221 | 221 |
| Hydrolysis resistance (Hour)*[4] |  |  | 860 | 840 | 210 | 170 |

*[1]Unit: mol/10³ kg
*[2]P: aromatic polycarbodiimide "Stabaxol P" (product name)
*[3]Unit: mol/10³ kg (total blending)
*[4]Period during which 70% of initial polylactic acid molecular weight is maintained at 80° C. and 95% RH.

As is obvious from the results of Examples and Comparative Examples shown in Table 3, Example 7 wherein the reactive monomer (B) was added to the aliphatic polyester resin (A) and then the reactive polymer (C) was added thereto; and Example 8 wherein various additives were simultaneously added had much more improved hydrolysis resistance than Comparative Examples 8 and 9 wherein the additives were used independently.

Reference Example 1

Terminal-blocked polylactic acid B (prepared in Example 5) 99% by mass and aromatic polycarbodiimide 1% by mass were mixed. The mixture was melt-kneaded in a desktop kneader, which was set so that the mixture had a temperature of about 180° C., and then extruded by an extruder, preparing pellets with a 3-mm diameter and a 5-mm length. The obtained pellets were used for evaluation of hydrolysis resistance. Table 4 shows the total amount of added carbodiimide group and the evaluation result on hydrolysis resistance.

Reference Example 2

Polylactic acid 98% by mass, aromatic monocarbodiimide 1% by mass and aromatic polycarbodiimide 1% by mass were mixed. The mixture was melt-kneaded in a desktop kneader, which was set so that the mixture had a temperature of about 180° C., and then extruded by an extruder, preparing pellets with a 3-mm diameter and a 5-mm length. The obtained pellets were used for evaluation of hydrolysis resistance. Table 4 shows the total amount of added carbodiimide group and the evaluation result on hydrolysis resistance.

Reference Comparative Example 1

Polylactic acid 98% by mass and aromatic polycarbodiimide 2% by mass were mixed. The mixture was melt-kneaded in a desktop kneader, which was set so that the mixture had a temperature of about 180° C., and then extruded by an extruder, preparing pellets with a 3-mm diameter and a 5-mm length. The obtained pellets were used for evaluation of hydrolysis resistance. Table 4 shows the total amount of added carbodiimide group and the evaluation result on hydrolysis resistance.

Reference Comparative Example 2

Polylactic acid 98% by mass and aromatic monocarbodiimide 2% by mass were mixed. The mixture was melt-kneaded in a desktop kneader, which was set so that the mixture had a temperature of about 180° C., and then extruded by an extruder, preparing pellets with a 3-mm diameter and a 5-mm length. The obtained pellets were used for evaluation of hydrolysis resistance. Table 4 shows the total amount of added carbodiimide group and the evaluation result on hydrolysis resistance.

TABLE 4

|  |  |  | Reference Example | | Reference Comparative Example | |
|---|---|---|---|---|---|---|
|  |  |  | 1 | 2 | 1 | 2 |
| Blend | Polylactic acid | Amount % by mass | 98.0 | 98.0 | 98.0 | 98.0 |
|  |  | Carboxy group concentration*[1] | 23 | 23 | 23 | 23 |
|  | Monocarbodiimide | Amount % by mass | 1 | 1 | — | 2 |
|  | Reaction between polylactic acid and monocarbodiimide |  | Yes | No | — | — |
|  | Carboxy group concentration after reaction between polylactic acid and monocarbodiimide*[1] |  | 1.1 | — | — | — |
|  | Polycarbodiimide | Kind*[2] | P | P | P | — |
|  |  | Amount % by mass | 1 | 1 | 2 | — |
|  | Total amount of added carbodiimide group*[3] |  | 56 | 56 | 56 | 56 |
| Hydrolysis resistance (Hour)*[4] |  |  | 180 | 180 | 130 | 120 |

*[1]Unit: mol/10³ kg
*[2]P: aromatic polycarbodiimide "Stabaxol P" (product name)
*[3]Unit: mol/10³ kg (total blending)
*[4]Period during which 70% of initial polylactic acid molecular weight is maintained at 80° C. and 95% RH.

Example 9

Terminal-blocked polylactic acid (prepared in Example 5) 49% by mass, aromatic polycarbodiimide 1% by mass, aluminum hydroxide 49.5% by mass and PTFE (polytetrafluoroethylene) 0.5% by mass were mixed. The mixture was melt-kneaded in a desktop kneader, which was set so that the mixture had a temperature of about 180° C., and then extruded by an extruder, preparing pellets with a 3-mm diameter and a 5-mm length. The obtained pellets were used for evaluation of hydrolysis resistance. Further, the obtained pellets were dried at 100° C. for 7 hours or more, and then a molded product with a plate thickness of 1.6 mm (length: 130 mm, width: 12 mm) was prepared using an injection-molding machine with a barrel temperature set to 190° C. The obtained molded product was subjected to a vertical flame test specified by UL (Underwriter Laboratories) 94 Standard for evaluation of flame retardancy. Evaluation results on hydrolysis resistance and flame retardancy are shown in Table 5.

Example 10

Pellets and a molded product were prepared in the same manner as in Example 9 except that aromatic polycarbodiimide 1% by mass used in Example 9 was replaced with aliphatic polycarbodiimide 1% by mass, and hydrolysis resistance and flame retardancy of the pellets and the molded product were evaluated in the same manner in Example 9. Evaluation results thereof are shown in Table 5.

Comparative Example 10

Polylactic acid 50% by mass, aluminum hydroxide 49.5% by mass and PTFE 0.5% by mass were mixed. The mixture was melt-kneaded in a desktop kneader, which was set so that the mixture had a temperature of about 180° C., and then extruded by an extruder, preparing pellets with a 3-mm diameter and a 5-mm length. The obtained pellets were used for evaluation of hydrolysis resistance. Further, the obtained pellets were dried at 100° C. for 7 hours or more, and then a molded product with a plate thickness of 1.6 mm (length: 130 mm, width: 12 mm) was prepared using an injection-molding machine with a barrel temperature set to 190° C. The obtained molded product was subjected to a vertical flame test specified by UL 94 Standard for evaluation of flame retardancy. Evaluation results on hydrolysis resistance and flame retardancy are shown in Table 5.

TABLE 5

| | | | Example | | Comparative Example |
|---|---|---|---|---|---|
| | | | 9 | 10 | 10 |
| Blend | Polylactic acid | Amount % by mass | 48.5 | 48.5 | 50 |
| | | Carboxy group concentration*[1] | 23 | 23 | 23 |
| | Monocarbodiimide | Amount % by mass | 0.5 | 0.5 | — |
| | Reaction between polylactic acid and monocarbodiimide | | Yes | Yes | — |
| | Carboxy group concentration after reaction between polylactic acid and monocarbodiimide*[1] | | 1.1 | 1.1 | — |
| | Polycarbodiimide | Kind*[2] | P | LA | — |
| | | Amount % by mass | 1.0 | 1.0 | — |
| | Aluminum hydroxide | Amount % by mass | 49.5 | 49.5 | 49.5 |
| | PTFE | Amount % by mass | 0.5 | 0.5 | 0.5 |
| UL 94 evaluation | | 1.6 mm flame retardancy | V-1 | not | V-1 |
| | | Total afterflame time (second) | 78 | 129 | 91 |
| Hydrolysis resistance (Hour)*[3] | | | 100 | 70 | 30 |

*[1] Unit: mol/10³ kg
*[2] P: aromatic polycarbodiimide "Stabaxol P" (product name) LA: aliphatic polycarbodiimide "Carbodiimide LA-1" (product name)
*[3] Period during which 70% of initial polylactic acid molecular weight is maintained at 80° C. and 95% RH.

As is obvious from the results of Examples 9 and 10 shown in Table 5, aromatic polycarbodiimide can provide more excellent flame retardant compositions than aromatic polycarbodiimide. Meanwhile, no inclusion of carbodiimide or polycarbodiimide causes a problem in hydrolysis resistance though providing sufficient flame retardancy as can be seen in Comparative Example 10.

The invention claimed is:
1. An aliphatic polyester resin composition, comprising an aliphatic polyester resin (A), a monocarbodiimide compound (B) and an aromatic polycarbodiimide compound (C);
   wherein the aliphatic polyester resin (A) is a polylactic acid resin;
   wherein the aliphatic polyester resin (A) and the monocarbodiimide compound (B) in total are present in an amount of 90% by mass to 99.9% by mass and the aromatic polycarbodiimide compound (C) is present in an amount of 0.1% by mass to 10% by mass, with respect to the total amount of (A), (B) and (C);
   wherein the aliphatic polyester resin composition is a reaction product of the monocarbodiimide compound (B); the aromatic polycarbodiimide compound (C); and the aliphatic polyester resin (A);
   wherein the monocarbodiimide compound (B) is selected from the group consisting of diisopropylcarbodiimide, bis(methylphenyl)carbodiimide, bis(methoxyphenyl)carbodiimide, N-ethyl-N'-(3-dimethylaminopropyl)carbodiimide and cyclic carbodiimides; and
   wherein the monocarbodiimide compound (B) is present in a different amount by mass than the aromatic polycarbodiimide compound (C).

2. A method for producing an aliphatic polyester resin composition according to claim 1, comprising adding the monocarbodiimide compound (B) first, and then the aromatic polycarbodiimide compound (C) to the aliphatic polyester resin (A).

3. A molded product comprising an aliphatic polyester resin composition according to claim 1.

4. An aliphatic polyester resin composition comprising: an aliphatic polyester resin (A), a monocarbodiimide compound (B) and an aromatic polycarbodiimide compound (C);
   wherein the aliphatic polyester resin (A) is a polylactic acid resin,
   wherein the aliphatic polyester resin (A) and the monocarbodiimide compound (B) in total are present in an amount of 90% to 99.9% by mass and the aromatic polycarbodiimide compound (C) is present in an amount of 0.1% to 10% by mass with respect to the total amount of (A), (B) and (C),
   wherein the aliphatic polyester resin composition is a reaction product of the monocarbodiimide compound (B); the aromatic polycarbodiimide compound (C); and the aliphatic polyester resin (A); and
   wherein the monocarbodiimide compound (B) is present in a different amount by mass than the aromatic polycarbodiimide compound (C).

5. The aliphatic polyester resin composition according to claim 1, wherein the aromatic polycarbodiimide compound (C) is synthesized from an organic diisocyanate, the organic diisocyanate being selected from the group consisting of 1,5-naphtharenediisocyanate, 4,4'-diphenylmethanediisocyanate, 4,4'-diphenyldimethylmethanediisocyanate, 1,3-phenylenediisocyanate, 1,4-phenylenediisocyanate, 2,4 tolylenediisocyanate, 2,6-tolylenediisocyanate, xylylene diisocyanate, tetramethylxylylenediisocyanate, 3,3',5,5'-tetraisopropylbiphenyl-4,4'-diisocyanate and 1,3,5-triisopropylbenzene-2,4-diisocyanate.

6. The aliphatic polyester resin composition according to claim 5, wherein the aromatic polycarbodiimide compound is present in an amount of 1% by mass to 7% by mass and wherein the monocarbodiimide compound (B) is diisopropylcarbodiimide and the aromatic polycarbodiimide compound (C) is synthesized from 1,3,5-triisopropylbenzene-2,4-diisocyanate.

7. A method for producing an aliphatic polyester resin composition according to claim 4 comprising adding the monocarbodiimide compound (B) first and then the aromatic polycarbodiimide compound (C) to the aliphatic polyester resin (A).

8. A method for producing an aliphatic polyester resin composition according to claim 5 comprising adding the monocarbodiimide compound (B) first and then the aromatic polycarbodiimide compound (C) to the aliphatic polyester resin (A).

9. A method for producing an aliphatic polyester resin composition according to claim 6 comprising adding the monocarbodiimide compound (B) first and then the aromatic polycarbodiimide compound (C) to the aliphatic polyester resin (A).

10. A molded product comprising an aliphatic polyester resin composition according to claim 4.

11. A molded product comprising an aliphatic polyester resin composition according to claim 5.

12. A molded product comprising an aliphatic polyester resin composition according to claim 6.

13. The aliphatic polyester resin composition according to claim 1, wherein the monocarbodiimide compound (B) is present in an amount of 0.5% by mass to 1.9% by mass and the aromatic polycarbodiimide compound (C) is present in an amount of 1% by mass to 7% by mass.

14. The aliphatic polyester resin composition according to claim 1, wherein the monocarbodiimide compound (B) is present in an amount of 0.5% by mass to 1.9% by mass and the aromatic polycarbodiimide compound (C) is present in an amount of 3% by mass to 7% by mass.

* * * * *